United States Patent
Figa

(10) Patent No.: US 10,642,457 B2
(45) Date of Patent: May 5, 2020

(54) SYSTEM AND METHOD FOR ORGANIZING AND DISPLAYING CONTACTS

(71) Applicant: Romek Figa, Hanover, MA (US)

(72) Inventor: Romek Figa, Hanover, MA (US)

(*) Notice: Subject to any disclaimer, the term of this patent is extended or adjusted under 35 U.S.C. 154(b) by 36 days.

(21) Appl. No.: 16/104,344

(22) Filed: Aug. 17, 2018

(65) Prior Publication Data
US 2019/0155466 A1    May 23, 2019

Related U.S. Application Data

(60) Provisional application No. 62/588,617, filed on Nov. 20, 2017, provisional application No. 62/593,392, filed on Dec. 1, 2017.

(51) Int. Cl.
*G06F 3/0484* (2013.01)
*G06Q 50/00* (2012.01)
*G06Q 10/10* (2012.01)
*G06F 16/248* (2019.01)
*G06F 16/23* (2019.01)
(Continued)

(52) U.S. Cl.
CPC .......... *G06F 3/0484* (2013.01); *G06F 3/0482* (2013.01); *G06F 3/04886* (2013.01); *G06F 7/08* (2013.01); *G06F 16/22* (2019.01); *G06F 16/2379* (2019.01); *G06F 16/248* (2019.01); *G06Q 10/107* (2013.01); *G06Q 50/01* (2013.01); *G06F 3/04817* (2013.01)

(58) Field of Classification Search
CPC .... G06F 3/0484; G06F 7/08; G06F 17/30377; G06F 17/30312; G06F 3/04886; G06F 3/0482; G06F 3/04817; G06F 16/248; G06F 16/2379; G06F 16/22; G06Q 50/01; G06Q 10/107
See application file for complete search history.

(56) References Cited

U.S. PATENT DOCUMENTS

2006/0031366 A1* 2/2006 Dolph ............... H04L 51/04
                                                                  709/207
2009/0248816 A1* 10/2009 Appelman ......... G06Q 10/107
                                                                  709/206
(Continued)

OTHER PUBLICATIONS

Act! Knowledgebase, "How to Use the Contact Activity Lookup", dated Aug. 15, 2017, 5 pages. [http://kb.act.com /app/answers/detail/ a_id/14312/ ?/how-to-use-the-contact-activity-lookup].
(Continued)

*Primary Examiner* — John T Repsher, III
(74) *Attorney, Agent, or Firm* — Nutter McClennen & Fish LLP

(57) ABSTRACT

A contact management system such as in a telephone or CRM system displays contact information from contact records based on a combination of contact record fields. In certain exemplary embodiments, contact records identified according to a Last Contacted field are prioritized based on a Last Activity field and are displayed in prioritized order via a graphical user interface, where the Last Contacted field of a record indicates the last time communication was made with that contact (e.g., via email or phone) and the Last Activity field of a record indicates the last time the contact record was updated in any of a variety of ways (e.g., last date of contact, or last time information in the record was edited by a user).

23 Claims, 6 Drawing Sheets

| Name | Contact Info | Last Contacted | Last Activity | Do Not Delete |
|---|---|---|---|---|
| Francine | 555-555-3456 | 01/01/13 | 12/31/14 | On |
| Diane | diane@web.org | 01/01/15 | 12/31/15 | On |
| Brittany | 555-555-1234 | 01/01/14 | 12/31/16 | Off |
| Edward | eddie@web.com | 01/01/12 | 09/30/17 | Off |

(51) Int. Cl.
    *G06F 16/22*     (2019.01)
    *G06F 7/08*     (2006.01)
    *G06F 3/0488*     (2013.01)
    *G06F 3/0482*     (2013.01)
    *G06F 3/0481*     (2013.01)

(56) References Cited

U.S. PATENT DOCUMENTS

2013/0091156 A1* 4/2013 Raiche .............. G06F 17/30522
    707/758
2014/0096001 A1* 4/2014 Zumbi .................. G06Q 50/01
    715/719
2014/0310653 A1* 10/2014 Han ...................... G06F 3/0482
    715/810

OTHER PUBLICATIONS

Agile CRM, "Sort Contacts by Date Last Contacted", dated Jul. 23, 2015, 8 pages. [https://www.agilecrm.com/blog/sort-contacts-by-last-contacted/].

Chrome web store, "Contacts Sort", dated Feb. 21, 2017, 7 pages. [https://chrome.google.com/webstore/detail/contacts-sort/dpaegjhc/jgkgogdfgdnacb/bneimco/?hl=en].

* cited by examiner

FIG. 1        100
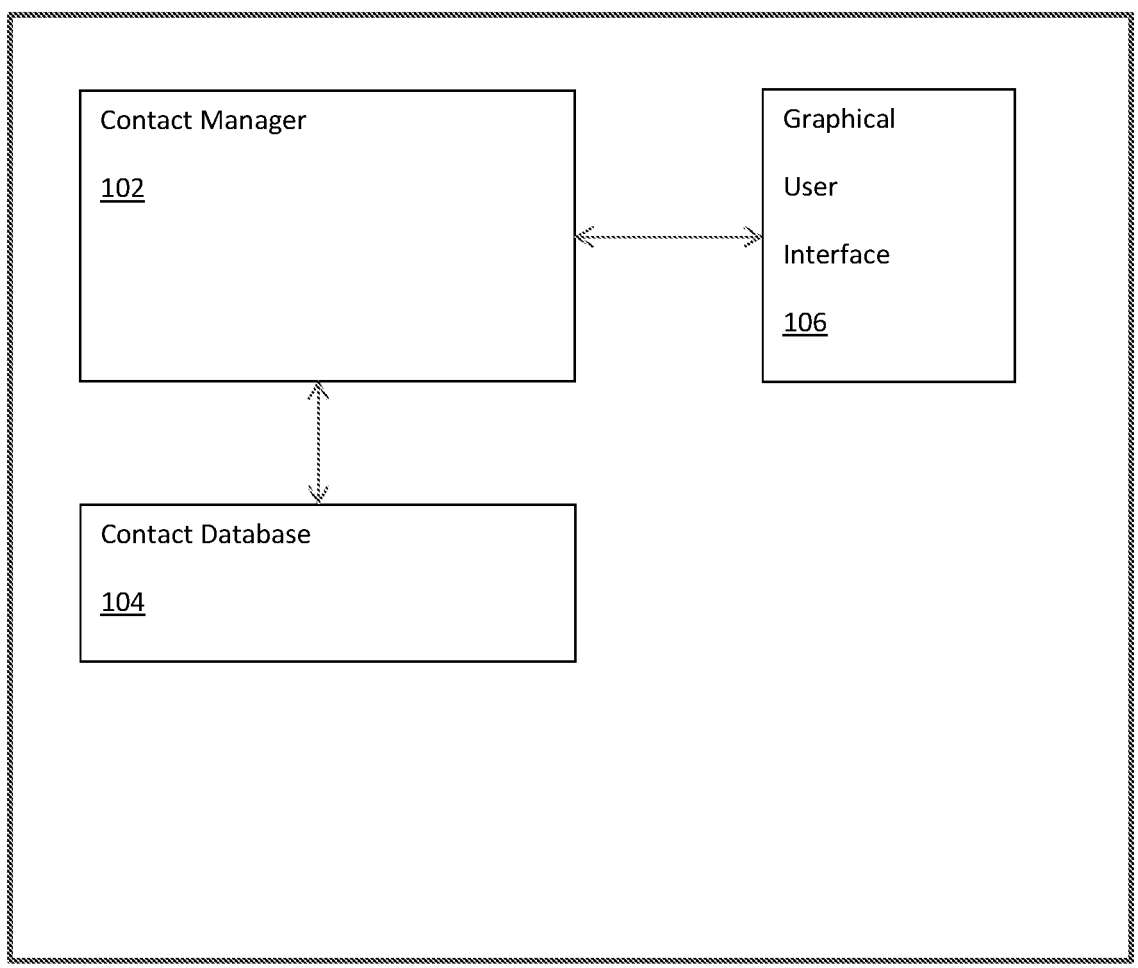

| Name | Contact Info | Last Contacted | Last Activity |
|---|---|---|---|
| Aaron | aaron@web.net | 01/01/16 | 04/01/16 |
| Brittany | 555-555-1234 | 01/01/14 | 12/31/16 |
| Charles | 555-555-2345 | 01/01/17 | 01/01/17 |
| Diane | diane@web.org | 01/01/15 | 12/31/15 |
| Edward | eddie@web.com | 01/01/12 | 09/30/17 |
| Francine | 555-555-3456 | 01/01/13 | 12/31/14 |

FIG. 2 (PRIOR ART)

| Name | Contact Info | Last Contacted | Last Activity |
|---|---|---|---|
| Edward | eddie@web.com | 01/01/12 | 09/30/17 |
| Francine | 555-555-3456 | 01/01/13 | 12/31/14 |
| Brittany | 555-555-1234 | 01/01/14 | 12/31/16 |
| Diane | diane@web.org | 01/01/15 | 12/31/15 |
| Aaron | aaron@web.net | 01/01/16 | 04/01/16 |
| Charles | 555-555-2345 | 01/01/17 | 01/01/17 |

FIG. 3 (PRIOR ART)

| Name | Contact Info | Last Contacted | Last Activity |
|---|---|---|---|
| Francine | 555-555-3456 | 01/01/13 | 12/31/14 |
| Diane | diane@web.org | 01/01/15 | 12/31/15 |
| Aaron | aaron@web.net | 01/01/16 | 04/01/16 |
| Brittany | 555-555-1234 | 01/01/14 | 12/31/16 |
| Charles | 555-555-2345 | 01/01/17 | 01/01/17 |
| Edward | eddie@web.com | 01/01/12 | 09/30/17 |

FIG. 4 (PRIOR ART)

| Name | Contact Info | Last Contacted | Last Activity |
|---|---|---|---|
| Edward | eddie@web.com | 01/01/12 | 09/30/17 |
| Francine | 555-555-3456 | 01/01/13 | 12/31/14 |
| Brittany | 555-555-1234 | 01/01/14 | 12/31/16 |
| Diane | diane@web.org | 01/01/15 | 12/31/15 |

FIG. 5 (PRIOR ART)

| Name | Contact Info | Last Contacted | Last Activity |
|---|---|---|---|
| Francine | 555-555-3456 | 01/01/13 | 12/31/14 |
| Diane | diane@web.org | 01/01/15 | 12/31/15 |
| Brittany | 555-555-1234 | 01/01/14 | 12/31/16 |
| Edward | eddie@web.com | 01/01/12 | 09/30/17 |

FIG. 6

| Name | Contact Info | Last Contacted | Last Activity |
|---|---|---|---|
| Francine | 555-555-3456 | 01/01/13 | 12/31/14 |
| Brittany | 555-555-1234 | 01/01/14 | 12/31/16 |
| Edward | eddie@web.com | 01/01/12 | 09/30/17 |
| Diane | diane@web.org | 01/01/15 | 10/25/17 |

Identify contact records meeting based on Last Contacted date

802

Prioritize identified contact records based on Last Activity date

804

Display prioritized contact records

806

Receive "touch" input for a given contact record

808

Update and store Last Activity date for the given contact record

810

Recycle to block 804

812

| Name | Contact Info | Last Contacted | Do Not Delete |
|---|---|---|---|
| Aaron | aaron@web.net | 01/01/16 | Off |
| Brittany | 555-555-1234 | 01/01/14 | Off |
| Charles | 555-555-2345 | 01/01/17 | Off |
| Diane | diane@web.org | 01/01/15 | On |
| Edward | eddie@web.com | 01/01/12 | Off |
| Francine | 555-555-3456 | 01/01/13 | On |

FIG. 9

| Name | Contact Info | Last Contacted | Do Not Delete |
|---|---|---|---|
| Edward | eddie@web.com | 01/01/12 | Off |
| Francine | 555-555-3456 | 01/01/13 | On |
| Brittany | 555-555-1234 | 01/01/14 | Off |
| Diane | diane@web.org | 01/01/15 | On |
| Aaron | aaron@web.net | 01/01/16 | Off |
| Charles | 555-555-2345 | 01/01/17 | Off |

FIG. 10

| Name | Contact Info | Last Contacted | Do Not Delete |
|---|---|---|---|
| Edward | eddie@web.com | 01/01/12 | Off |
| Brittany | 555-555-1234 | 01/01/14 | Off |
| Aaron | aaron@web.net | 01/01/16 | Off |
| Charles | 555-555-2345 | 01/01/17 | Off |
| Francine | 555-555-3456 | 01/01/13 | On |
| Diane | diane@web.org | 01/01/15 | On |

FIG. 11

| Name | Contact Info | Last Contacted | Last Activity | Do Not Delete |
|---|---|---|---|---|
| Edward | eddie@web.com | 01/01/12 | 09/30/17 | Off |
| Francine | 555-555-3456 | 01/01/13 | 12/31/14 | On |
| Brittany | 555-555-1234 | 01/01/14 | 12/31/16 | Off |
| Diane | diane@web.org | 01/01/15 | 12/31/15 | On |

FIG. 12

| Name | Contact Info | Last Contacted | Last Activity | Do Not Delete |
|---|---|---|---|---|
| Francine | 555-555-3456 | 01/01/13 | 12/31/14 | On |
| Diane | diane@web.org | 01/01/15 | 12/31/15 | On |
| Brittany | 555-555-1234 | 01/01/14 | 12/31/16 | Off |
| Edward | eddie@web.com | 01/01/12 | 09/30/17 | Off |

FIG. 13

| Name | Contact Info | Last Contacted | Last Activity | Do Not Delete |
|---|---|---|---|---|
| Brittany | 555-555-1234 | 01/01/14 | 12/31/16 | Off |
| Edward | eddie@web.com | 01/01/12 | 09/30/17 | Off |
| Francine | 555-555-3456 | 01/01/13 | 12/31/14 | On |
| Diane | diane@web.org | 01/01/15 | 12/31/15 | On |

FIG. 14

SYSTEM AND METHOD FOR ORGANIZING AND DISPLAYING CONTACTS

CROSS-REFERENCE TO RELATED APPLICATION(S)

This patent application claims the benefit of U.S. Provisional Patent Application No. 62/588,617 entitled SYSTEM AND METHOD FOR ORGANIZING AND DISPLAYING CONTACTS filed Nov. 20, 2017 and U.S. Provisional Patent Application No. 62/593,392 entitled SYSTEM AND METHOD FOR ORGANIZING AND DISPLAYING CONTACTS filed Dec. 1, 2017, each of which is hereby incorporated herein by reference in its entirety.

FIELD OF THE INVENTION

The present invention relates generally to contact management systems and, more particularly, to a system and method for organizing and displaying contacts.

BACKGROUND OF THE INVENTION

Contact management systems such as in telephone and customer relationship management (CRM) systems allow users to maintain vast amounts of information about their various contacts, such as phone numbers, home addresses, business addresses, email addresses, and other information. Each contact is associated with a contact record in which the information about the contact is stored. Generally speaking, contact management systems allow contact records to be viewed in a variety of ways, such as, for example, alphabetically by name, chronologically according to the last communication with the contact (e.g., the last time the contact was phoned or emailed), chronologically according to the last contact record update, etc.

SUMMARY OF EXEMPLARY EMBODIMENTS

In accordance with one embodiment of the invention, a computer program product comprising a tangible, non-transitory computer-readable medium has embodied therein a computer program for prioritized display of contact records which, when executed on a computer processor, causes the computer processor to implement a contact manager that is configured to perform computer processes comprising storing contact records in a contact database, each contact record including a Last Contacted field providing a date of last contact and a Last Activity field providing a date of last activity; identifying a set of contact records in the contact database based on Last Contacted date; sorting the identified contact records to prioritize the identified contact records based on Last Activity date; and displaying the identified contact records via the graphical user interface in prioritized order.

In accordance with another embodiment of the invention, a contact management system comprises a contact database; a graphical user interface; and a contact manager configured to perform computer processes comprising storing contact records in a contact database, each contact record including a Last Contacted field providing a date of last contact and a Last Activity field providing a date of last activity; identifying a set of contact records in the contact database based on Last Contacted date; sorting the identified contact records to prioritize the identified contact records based on Last Activity date; and displaying the identified contact records via the graphical user interface in prioritized order.

In accordance with another embodiment, a computer-implemented method for prioritized display of contact records uses computer processes comprising storing contact records in a contact database, each contact record including a Last Contacted field providing a date of last contact and a Last Activity field providing a date of last activity; identifying a set of contact records in the contact database based on Last Contacted date; sorting the identified contact records to prioritize the identified contact records based on Last Activity date; and displaying the identified contact records via the graphical user interface in prioritized order.

In any of the above-described embodiments, computer processes may further comprise providing, via the graphical user interface, a mechanism for a user to touch a selected contact record from among the displayed contact records; receiving a touch input via the graphical user interface selecting a given contact record from among the displayed contact records; and updating the Last Activity field of the given contact record to a current date as the date of last activity. The mechanism may allow a user to select the contact record via the graphical user interface by clicking on the contact record. Additionally or alternatively, the mechanism may allow a user to select the contact record via the graphical user interface by selecting a touch option from a menu displayed by the contact manager.

In any of the above-described embodiments, computer processes may further comprise re-sorting the identified contact records to prioritize the identified contact records based on Last Activity date; and re-displaying the identified contact records via the graphical user interface in prioritized order. Alternatively, computer processes may further comprise removing the given contact record from the set of identified contact records to produce an updated set of contact records; sorting the updated set of contact records to prioritize the updated set of contact records based on Last Activity date; and displaying the updated set of contact records via the graphical user interface in prioritized order.

In any of the above-described embodiments, identifying the set of contact records may involve receiving, via the graphical user interface, a date or date range; and identifying the set of contact records based on the date or date range. The contact manager and the contact database may run on the same device or may run on separate devices in communication over a communication system. The contact manager may provide the graphical user interface.

In accordance with another embodiment of the invention, a computer program product, system, and computer-implemented method may use computer processes comprising storing contact records in a contact database, each contact record including a Last Activity field for storing a date of last activity; causing display of a set of contact records from the contact database via a graphical user interface; providing, via the graphical user interface, a touch option to allow a user to touch a selected contact record from among the displayed set of contact records; and setting the Last Activity field of the touched contact record to a current date.

In such an embodiment, the touch option may be provided in any of a variety of ways, such as, for example, by allowing the user to select the contact record, by providing a "touch" option from a menu displayed when the user selects the contact record, by entering a predetermined keystroke or keystrokes when the contact record is selected, or by including in the display a "touch" option in the form of a selectable icon or button.

In accordance with another embodiment of the invention, a computer program product, system, and computer-implemented method may use computer processes comprising storing contact records in a contact database, each contact record including a Last Contacted field providing a date of last contact and a Last Activity field providing a date of last activity; and causing display of a set of contact records from the contact database via a graphical user interface, wherein, for each of the displayed contact records, the Last Contacted date and the Last Activity date are displayed.

Additional embodiments may be disclosed and claimed.

BRIEF DESCRIPTION OF THE DRAWINGS

The foregoing features of embodiments will be more readily understood by reference to the following detailed description, taken with reference to the accompanying drawings, in which:

FIG. 1 is a schematic diagram of a contact management system, in accordance with exemplary embodiments.

FIG. 2 is a schematic diagram showing a representation of various contact records stored in a contact database, as known in the art.

FIG. 3 is a schematic diagram showing a representation of the contact records of FIG. 2 displayed chronologically by Last Contacted date, as known in the art.

FIG. 4 is a schematic diagram showing a representation of the contact records of FIG. 2 displayed chronologically by Last Activity date, as known in the art.

FIG. 5 is a schematic diagram showing a representation of contact records of FIG. 2 for which there has been no communication for over two years based on an exemplary search date of Oct. 25, 2017, as known in the art.

FIG. 6 is a schematic diagram showing a representation of contact records of FIG. 2 for which there has been no communication for over two years based on an exemplary search date of Oct. 25, 2017, in accordance with one exemplary embodiment.

FIG. 7 is a schematic diagram showing a representation of contact records of FIG. 6 showing the results of "touching" a contact record, in accordance with one exemplary embodiment.

FIG. 8 is a logic flow diagram for displaying and updating contact records by the contact manager 102, in accordance with an exemplary embodiment.

FIG. 9 is a schematic diagram showing a representation of various contact records stored in a contact database 104, in accordance with one exemplary embodiment.

FIG. 10 is a schematic diagram showing a representation of the contact records of FIG. 9 displayed chronologically by Last Contacted date, in accordance with one exemplary embodiment.

FIG. 11 is a schematic diagram showing a representation of contact records of FIG. 9 prioritized by a combination of Last Contact field and Do Not Delete field, in accordance with one exemplary embodiment.

FIG. 12 is a schematic diagram showing a representation of contact records for which there has been no communication for over two years based on an exemplary search date of Oct. 25, 2017, in accordance with one exemplary embodiment.

FIG. 13 is a schematic diagram showing a representation of contact records of FIG. 12 prioritized by Last Activity date, in accordance with one exemplary embodiment.

FIG. 14 is a schematic diagram showing a representation of contact records of FIG. 13 prioritized by a combination of Last Contact field, Last Activity field, and Do Not Delete field, in accordance with one exemplary embodiment.

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

In exemplary embodiments, a contact management system such as in a telephone or CRM system displays contact information from contact records based on a combination of contact record fields. In certain exemplary embodiments, contact records identified according to a Last Contacted field are prioritized based on a Last Activity field and are displayed in prioritized order via a graphical user interface, where the Last Contacted field of a record indicates the last time communication was made with that contact (e.g., via incoming or outgoing email, phone, letter, etc.) and the Last Activity field of a record indicates a date of last activity (e.g., date of last contact, or last time information in the record was edited by a user).

FIG. 1 is a schematic diagram of a contact management system 100, in accordance with exemplary embodiments. Among other things, the contact management system 100 includes a contact manager 102, a contact database 104, and a graphical user interface 106. The contact manager 102 allows user to create and manipulate contact records that are stored in the contact database 104 via the graphical user interface 106.

FIG. 2 is a schematic diagram showing a representation of various contact records stored in a contact database 104, as known in the art. Among other things, each contact record includes a Name field, a Contact Info field, a Last Contacted field, and a Last Activity field. The Last Contacted field represents the date of last communication with the contact, e.g., sending or receiving a call, email, letter, etc. The Last Activity field represents the date of last activity to the contact record, typically including any update of information in the contact record including the Last Contacted field. Thus, in many contact management systems, the date in the Last Activity field will never be earlier than the date in the Last Contacted field, although the date in the Last Activity field can be later than the date in the Last Contacted field. Here, the contact records are displayed alphabetically by name.

The contact database of FIG. 2 includes contact records for imaginary people named Aaron, Brittany, Charles, Diane, Edward, and Francine.

Aaron has an email address of aaron@web.net and was last contacted on Jan. 1, 2016, and a last activity date of Apr. 1, 2016.

Brittany has a phone number of 555-555-1234 and was last contacted on Jan. 1, 2014, and a last activity date of Dec. 31, 2016.

Charles has a phone number of 555-555-2345 and was last contacted on Jan. 1, 2017, which is the last activity date of the contact record.

Diane has an email address of diane@web.org and was last contacted on Jan. 1, 2015, and a last activity date of Dec. 31, 2015.

Edward has an email address of eddie@web.com and was last contacted on Jan. 1, 2012, and a last activity date of Sep. 30, 2017.

Francine has a phone number of 555-555-3456 and was last contacted on Jan. 1, 2013, and a last activity date of Dec. 31, 2014.

The contact management system typically allows contact records to be displayed chronologically by Last Contacted or Last Activity date.

FIG. 3 is a schematic diagram showing a representation of the contact records of FIG. 2 displayed chronologically by Last Contacted date, as known in the art. Here, the contact records of FIG. 2 are displayed chronologically by Last Contacted date from least recent to most recent, i.e., Edward, Francine, Brittany, Diane, Aaron, and Charles.

FIG. 4 is a schematic diagram showing a representation of the contact records of FIG. 2 displayed chronologically by Last Activity date, as known in the art. Here, the contact records of FIG. 2 are displayed chronologically by Last Activity date from least recent to most recent, i.e., Francine, Diane, Aaron, Brittany, Charles, and Edward.

From time to time, the user may want to view contacts for which there has been no communication for more than some selected amount of time, e.g., to communicate with such contacts before they get too "stale," or to review for possible deletion of obsolete contacts from the contact database.

FIG. 5 is a schematic diagram showing a representation of contact records of FIG. 2 for which there has been no communication for over two years based on an exemplary search date of Oct. 25, 2017, as known in the art. Here, the contact records of Edward, Francine, Brittany, and Diane are identified and displayed in chronological order.

Unfortunately, merely displaying these contacts in chronological order does not provide a "big picture" view of the contacts. What the user really should see is a prioritized listing of contacts based on a combination of the Last Contacted and Last Activity dates. For example, with reference again to FIG. 5, while Edward has the oldest Last Contacted date, it is really Francine who is most in need of attention because Edward's contact record was last updated on Sep. 30, 2017 whereas Francine's contact record was last updated on Dec. 31, 2014.

FIG. 6 is a schematic diagram showing a representation of contact records of FIG. 2 for which there has been no communication for over two years based on an exemplary search date of Oct. 25, 2017, in accordance with one exemplary embodiment. Here, unlike in FIG. 5, the contact records are displayed in the order of Francine, Diane, Brittany, and Edward based on a combination of the Last Contacted and Last Activity dates. Specifically, the Last Contacted date is used to identify the contact records that satisfy the search criterion and the Last Activity date is used to prioritize the identified contact records so that the identified contact records are displayed in order of priority based on a combination of the Last Contacted and Last Activity dates. For each of the displayed contact records, the Last Contacted date and the Last Activity date may be displayed. Among other things, the Last Contacted date and the Last Activity date information allows the user to evaluate each contact record, e.g., for possible deletion, update, or contact.

It should be noted that, in certain exemplary embodiments, the user does not have to expressly request that the identified contact records be sorted according to the Last Activity dates but instead the identified contact records are automatically displayed in order of priority. For example, prioritized order may be the default for displaying the identified contact records.

Once the identified contact records are displayed in order of priority as in FIG. 6, the contact manager 102 typically provides the user with various options for manipulating the identified contact records via the graphical user interface 106, such as, for example, to email or call a contact, or to edit a contact. In certain exemplary embodiments, the contact manager 102 allows the user to "touch" a contact (e.g., by selecting the contact record, by providing a "touch" option from a menu displayed when the user selects the contact record, by entering a predetermined keystroke or keystrokes when the contact record is selected, by including in the display a "touch" option in the form of a selectable icon or button, etc.), which effectively sets the Last Activity field to the date on which the contact was touched, thereby effectively lowering the priority of the contact in future displays relative to the other identified contacts. Preferably, the "touch" option does not require the user to open the contact record, edit the contact record, and save the edited contact record as typically would be required when updating information in the contact record, although such updating also would set the Last Activity field to the current date.

FIG. 7 is a schematic diagram showing a representation of contact records of FIG. 6 showing the results of "touching" a contact record, in accordance with one exemplary embodiment. Here, the user "touched" Diane's contact record, which caused the contact manager 102 to update the Last Activity date in Diane's contact record stored in the contact database 104 to Oct. 25, 2017 and to move Diane's contact record to the end of the displayed list.

FIG. 8 is a logic flow diagram for displaying and updating contact records by the contact manager 102, in accordance with an exemplary embodiment. In block 802, the contact manager 102 identifies contact records meeting search criteria based on Last Contacted date. In block 804, the contact manager 102 sorts the identified contact records based on the Last Activity date. In block 806, the contact manager 102 displays the sorted contact records via the graphical user interface 106 in prioritized order. In block 808, the contact manager 102 receives a "touch" input for a given contact record via the graphical user interface 106. In block 810, the contact manager 102 updates the Last Update date for the given contact record and stores the updated contact record in the contact database 104. In block 812, the contact manager 102 recycles to block 804 to re-sort and re-display the contact records based on the updated contact record.

It should be noted that the prioritized contact records can be displayed in any form desired, such as, for example, a single page listing multiple contact records in prioritized order, or contact records presented one at a time in prioritized order such as when a user scrolls from page to page. A "touched" contact record can be removed such that it is no longer displayed when the contact records are re-sorted and re-displayed.

It also should be noted that in various alternative embodiments, the search criteria can include a field other than or in addition to the Last Contacted field, and sorting can be done on a field other than or in addition to the Last Activity field.

It also should be noted that in various alternative embodiments, the contact records may be configured or updated to include a separate "touch" field that can be used to sort the records separately from the Last Activity field.

Additionally or alternatively, contact records may be configured or updated to include a "do not delete" field (which, in some embodiments, could be the separate "touch" field discussed above), which, when set to a "do not delete" value, prevents the contact record from being inadvertently deleted. For example, if the user selects a "do not delete" contact individually or as part of a group of contacts and attempts to delete the selected contact(s), the contact manager 102 may take an action to prevent inadvertent deletion of the "do not delete" contact(s), such as, for example, blocking the deletion operation altogether (e.g., displaying a warning that one or more "do not delete" contacts have been selected), deleting only selected contacts that are not marked as "do not delete," requiring the user to confirm the intention to delete the "do not delete" contact (e.g., by displaying a warning and requiring the user to take an affirmative action to complete the deletion operation), or requiring the user to reset the "do not delete" field before the contact record can be deleted. The "do not delete" field can be a single bit (flag) in the contact record that can be toggled on/off to set/reset the flag.

In certain exemplary embodiments, the contact manager 102 allows the user to "touch" a contact in order to set or reset the "do not delete" field (e.g., by selecting the contact record, by providing a "do not delete" option from a menu displayed when the user selects the contact record, by entering a predetermined keystroke or keystrokes when the contact record is selected, by including in the display a "do not delete" option in the form of a selectable icon or button, etc.). Preferably, the "do not delete" option does not require the user to open the contact record, edit the contact record, and save the edited contact record as typically would be required when updating information in the contact record.

FIG. 9 is a schematic diagram showing a representation of various contact records stored in a contact database 104, in accordance with one exemplary embodiment. Among other things, each contact record includes a Name field, a Contact Info field, a Last Contacted field, and a Do Not Delete field. The Last Contacted field represents the date of last communication with the contact, e.g., sending or receiving a call, email, letter, etc. The Do Not Delete field indicates a "do not delete" value (in this example, "Off" indicates that "do not delete" is off and the contact record can be deleted, while "On" indicates that "do not delete" is on and the contact record cannot be deleted. Here, the contact records for Diane and Francine are marked as "do not delete."

As discussed above, the contact management system typically allows contact records to be displayed chronologically, e.g., by Last Contacted or Last Activity date.

FIG. 10 is a schematic diagram showing a representation of the contact records of FIG. 9 displayed chronologically by Last Contacted date, in accordance with one exemplary embodiment. Here, the contact records of FIG. 9 are displayed chronologically by Last Contacted date from least recent to most recent, i.e., Edward, Francine, Brittany, Diane, Aaron, and Charles.

Assume that the user selects the contact records for Edward, Francine, and Brittany based on the display order of FIG. 10 and attempts to delete these contact records. The contact manager 102 may be configured to ensure that the contact record for Francine (which is marked as "do not delete") is not inadvertently deleted, e.g., by blocking the deletion operation altogether (e.g., displaying a warning that one or more "do not delete" contacts have been selected), deleting only the contact records for Edward and Brittany which are not marked as "do not delete," displaying a warning that a selected record is marked "do not delete" and requiring the user to take an affirmative action to complete the deletion operation, or requiring the user to reset the "do not delete" field before the contact record can be deleted.

Additionally or alternatively, similar to use of the Last Activity field to prioritize contact records for display, the "do not delete" field can be used to prioritize contact records for display. Specifically, contact records that are marked as "do not delete" may be prioritized lower than contact records that are not marked as "do not delete" when displaying the contact records based on another criterion such as Last Contact or Last Activity date.

FIG. 11 is a schematic diagram showing a representation of contact records of FIG. 9 prioritized by a combination of Last Contact field and Do Not Delete field, in accordance with one exemplary embodiment. Here, unlike in FIG. 10, the contact records are displayed in the order of Edward, Brittany, Aaron, Charles, Francine, and Diane based on a combination of the Last Contacted field and Do Not Delete field. Specifically, because the contact records for Diane and Francine are marked as "do not delete," these contact records are prioritized below the other contact records in the display. If, as here, multiple contact records are marked as "do not delete," then the "do not delete" records generally are displayed as a group in chronological order based on the Last Contacted date, as shown in FIG. 11. For each of the displayed contact records, the Last Contacted date and the Do Not Delete value may be displayed. Among other things, the displayed Last Contacted date and the Do Not Delete value information allows the user to evaluate each contact record, e.g., for possible deletion, update, or contact.

It should be noted that the examples described above with reference to FIGS. 9-11 omit a Last Activity field for the sake of convenience, but alternative embodiments may include a Last Activity field in addition to a "do not delete" field, and contact records can be prioritized for display based on a combination of Last Activity date and Do Not Delete value.

FIG. 12 is a schematic diagram showing a representation of contact records for which there has been no communication for over two years based on an exemplary search date of Oct. 25, 2017, in accordance with one exemplary embodiment. In this example, the Last Activity field is based on information from FIG. 2, and the Do Not Delete field is based on information from FIG. 9. Here, as in FIG. 5, the contact records of Edward, Francine, Brittany, and Diane are identified and displayed in chronological order.

FIG. 13 is a schematic diagram showing a representation of contact records of FIG. 12 prioritized by Last Activity date, in accordance with one exemplary embodiment. Here, as in FIG. 6, the the contact records are displayed in the order of Francine, Diane, Brittany, and Edward based on a combination of the Last Contacted and Last Activity dates.

FIG. 14 is a schematic diagram showing a representation of contact records of FIG. 13 prioritized by a combination of Last Contact field, Last Activity field, and Do Not Delete field, in accordance with one exemplary embodiment. Here, unlike in FIG. 13, the contact records are displayed in the order of, Brittany, Edward, Francine, and Diane based on a combination of the Last Contacted field, Last Activity field, and Do Not Delete field. Specifically, because the contact records for Diane and Francine are marked as "do not delete," these contact records are prioritized below the other contact records in the display. If, as here, multiple contact records are marked as "do not delete," then the "do not delete" records generally are displayed as a group in chronological order based on the Last Contacted date, as shown in FIG. 14. For each of the displayed contact records, the Last Contacted date and the Do Not Delete value may be displayed. Among other things, the displayed Last Contacted date and the Do Not Delete value information allows the user to evaluate each contact record, e.g., for possible deletion, update, or contact.

It should be noted that, in certain exemplary embodiments, the user does not have to expressly request that the identified contact records be prioritized according to the Do Not Delete values but instead the identified contact records are automatically displayed in order of priority. For example, prioritized order may be the default for displaying the identified contact records.

In certain embodiments, the Last Activity field can be used as a "do not delete" field under certain conditions. For example, with reference again to FIG. 5, which shows a representation of contact records of FIG. 2 for which there has been no communication for over two years based on an exemplary search date of Oct. 25, 2017 (i.e., Last Contact date before 10/25/15), the contact manager 102 may treat any displayed contact record having a Last Activity date on or after Oct. 25, 2015 as being a "do not delete" record for this particular display such that the contact manager 102 would block an attempt by the user to delete a displayed contact record having a Last Activity date on or after Oct. 25, 2015 (i.e., Edward, Brittany, and Diane in this example) such as by blocking the deletion operation altogether (e.g., displaying a warning that one or more "do not delete" contacts have been selected), deleting only selected contacts that are not considered as "do not delete," requiring the user to confirm the intention to delete the "do not delete" contact (e.g., by displaying a warning and requiring the user to take an affirmative action to complete the deletion operation), or requiring the user to reset the "do not delete" field before the contact record can be deleted.

It also should be noted that exemplary contact record field names used herein are for convenience. Different contact management systems may use different names for similar fields. The present invention is not limited to or by the field names.

It should be noted that the contact management system 100 may be implemented for use in any of a variety of devices, such as, for example, smartphones, telephone systems, computers, and other types of devices. The contact management system 100 may be implemented as a distributed system, e.g., with the contact manager 102 implemented for use in a client device and the contact database 104 implemented for use in a server device. Such devices typically include one or more network interfaces for communicating over a communication network and a processor (e.g., a microprocessor with memory and other peripherals and/or application-specific hardware) configured accordingly to perform device functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message. Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

Importantly, it should be noted that embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems (e.g., the contact management systems and contact managers described herein) are necessarily non-conventional because, absent special programming or configuration, the conventional components do not inherently perform the described non-conventional methods.

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P26. A computer-implemented method for prioritized display of contact records, the method using computer processes comprising:

storing contact records in a contact database, each contact record including a Last Contacted field providing a date of last contact and a Last Activity field providing a date of last activity; and causing display of a set of contact records from the contact database via a graphical user interface, wherein, for each of the displayed contact records, the Last Contacted date and the Last Activity date are displayed.

The present invention may be embodied in other specific forms without departing from the true scope of the invention, and numerous variations and modifications will be apparent to those skilled in the art based on the teachings herein. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A computer program product comprising a tangible, non-transitory computer-readable medium having embodied therein a computer program for prioritized display of contact records which, when executed on a computer processor, causes the computer processor to implement a contact manager that is configured to perform computer processes comprising:

storing the contact records in a contact database, each contact record including a Last Contacted field providing a date of last contact and a separate Last Activity field providing a date of last activity, the date of last activity being the later of (a) the date of last contact of the contact record and (b) a date of last modification of the contact record;

identifying a set of least recently contacted contact records in the contact database based on the date of last contact from the Last Contacted field of each of the contact records;

sorting the identified set of least recently contacted contact records into a first chronologically prioritized order based on the date of last activity from the Last Activity field of each of the identified set of contact records such that the contact record from the identified set of least recently contacted contact records having the oldest date of last activity is the highest priority;

displaying the sorted identified contact records via a graphical user interface in the first chronologically prioritized order;

providing, via the graphical user interface, a mechanism for a user to touch a selected contact record from among the displayed contact records;

receiving a touch input via the graphical user interface selecting a given contact record from among the displayed contact records;

updating the Last Activity field of the given contact record to a current date; and after updating the Last Activity field of the given contact record to the current date:
re-sorting the identified set of least recently contacted contact records into a second chronologically prioritized order to prioritize the identified set of least recently contacted contact records based on the date of last activity from the Last Activity field of each of the identified set of contact records such that the given contact record is prioritized based on its updated Last Activity field and such that the contact record from the identified set of least recently contacted contact records having the oldest date of last activity is the highest priority; and
re-displaying the identified set of contact records via the graphical user interface in the second chronologically prioritized order.

2. The computer program product according to claim 1, wherein updating the Last Activity field of the given contact record to a current date is done without requiring the user to open the given contact record.

3. The computer program product according to claim 1, wherein the mechanism allows a user to select the given contact record via the graphical user interface by clicking on the given contact record.

4. The computer program product according to claim 1, wherein the mechanism allows a user to select the given contact record via the graphical user interface by selecting a touch option from a menu displayed by the contact manager.

5. The computer program product according to claim 1, wherein each contact record further includes a separate "do not delete" field, and wherein, when sorting the identified set of contact records and the updated set of contact records, the contact record having the oldest date of last activity and not marked as "do not delete" is the highest priority.

6. The computer program product according to claim 5, further comprising:
blocking deletion of a contact record marked as "do not delete".

7. The computer program product according to claim 1, wherein identifying the set of contact records comprises:
receiving, via the graphical user interface, a date; and
identifying contact records in the contact database having a date of last contact older than the received date.

8. A contact management system comprising:
a contact database stored in a computer-readable medium;
a graphical user interface; and
at least one processor implementing a contact manager configured to perform computer processes comprising:
storing the contact records in a contact database, each contact record including a Last Contacted field providing a date of last contact and a separate Last Activity field providing a date of last activity, the date of last activity being the later of (a) the date of last contact of the contact record and (b) a date of last modification of the contact record;
identifying a set of least recently contacted contact records in the contact database based on the date of last contact from the Last Contacted field of each of the contact records;
sorting the identified set of least recently contacted contact records into a first chronologically prioritized order based on the date of last activity from the Last Activity field of each of the identified set of contact records such that the contact record from the identified set of least recently contacted contact records having the oldest date of last activity is the highest priority;
displaying the sorted identified contact records via a graphical user interface in the first chronologically prioritized order;
providing, via the graphical user interface, a mechanism for a user to touch a selected contact record from among the displayed contact records;
receiving a touch input via the graphical user interface selecting a given contact record from among the displayed contact records;
updating the Last Activity field of the given contact record to a current date; and
after updating the Last Activity field of the given contact record to the current date:
re-sorting the identified set of least recently contacted contact records into a second chronologically prioritized order to prioritize the identified set of least recently contacted contact records based on the date of last activity from the Last Activity field of each of the identified set of contact records such that the given contact record is prioritized based on its updated Last Activity field and such that the contact record from the identified set of least recently contacted contact records having the oldest date of last activity is the highest priority; and
re-displaying the identified set of contact records via the graphical user interface in the second chronologically prioritized order.

9. The system according to claim 8, wherein updating the Last Activity field of the given contact record to a current date is done without requiring the user to open the given contact record.

10. The system according to claim 8, wherein the mechanism allows a user to select the given contact record via the graphical user interface by clicking on the given contact record.

11. The system according to claim 8, wherein the mechanism allows a user to select the given contact record via the graphical user interface by selecting a touch option from a menu displayed by the contact manager.

12. The system according to claim 8, wherein each contact record further includes a separate "do not delete" field, and wherein, when sorting the identified set of contact records and the updated set of contact records, the contact record having the oldest date of last activity and not marked as "do not delete" is the highest priority.

13. The system according to claim 12, further comprising:
blocking deletion of a contact record marked as "do not delete".

14. The system according to claim 8, wherein identifying the set of contact records comprises:
receiving, via the graphical user interface, a date; and
identifying contact records in the contact database having a date of last contact older than the received date.

15. The system according to claim 8, wherein the contact manager and the contact database run on separate devices in communication over a communication system.

16. The system according to claim 8, wherein the contact manager provides the graphical user interface.

17. A computer-implemented method for prioritized display of contact records, the method using computer processes comprising:
storing the contact records in a contact database, each contact record including a Last Contacted field providing a date of last contact and a separate Last Activity field providing a date of last activity, the date of last activity being the later of (a) the date of last contact of the contact record and (b) a date of last modification of the contact record;

identifying a set of least recently contacted contact records in the contact database based on the date of last contact from the Last Contacted field of each of the contact records;

sorting the identified set of least recently contacted contact records into a first chronologically prioritized order based on the date of last activity from the Last Activity field of each of the identified set of contact records such that the contact record from the identified set of least recently contacted contact records having the oldest date of last activity is the highest priority;

displaying the sorted identified contact records via a graphical user interface in the first chronologically prioritized order;

providing, via the graphical user interface, a mechanism for a user to touch a selected contact record from among the displayed contact records;

receiving a touch input via the graphical user interface selecting a given contact record from among the displayed contact records;

updating the Last Activity field of the given contact record to a current date; and after updating the Last Activity field of the given contact record to the current date:

re-sorting the identified set of least recently contacted contact records into a second chronologically prioritized order to prioritize the identified set of least recently contacted contact records based on the date of last activity from the Last Activity field of each of the identified set of contact records such that the given contact record is prioritized based on its updated Last Activity field and such that the contact record from the identified set of least recently contacted contact records having the oldest date of last activity is the highest priority; and re-displaying the identified set of contact records via the graphical user interface in the second chronologically prioritized order.

18. The computer-implemented method according to claim 17, wherein updating the Last Activity field of the given contact record to a current date is done without requiring the user to open the given contact record.

19. The computer-implemented method according to claim 17, wherein the mechanism allows a user to select the given contact record via the graphical user interface by clicking on the given contact record.

20. The computer-implemented method according to claim 17, wherein the mechanism allows a user to select the given contact record via the graphical user interface by selecting a touch option from a menu displayed by the contact manager.

21. The computer-implemented method according to claim 17, wherein each contact record further includes a separate "do not delete" field, and wherein, when sorting the identified set of contact records and the updated set of contact records, the contact record having the oldest date of last activity and not marked as "do not delete" is the highest priority.

22. The computer-implemented method according to claim 21, further comprising:

blocking deletion of a contact record marked as "do not delete".

23. The computer-implemented method according to claim 17, wherein identifying the set of contact records comprises:

receiving, via the graphical user interface, a date; and
identifying contact records in the contact database having a date of last contact older than the received date.

* * * * *